No. 707,499. Patented Aug. 19, 1902.
J. P. BIRMINGHAM.
NUT LOCK.
(Application filed Dec. 14, 1901.)
(No Model.)
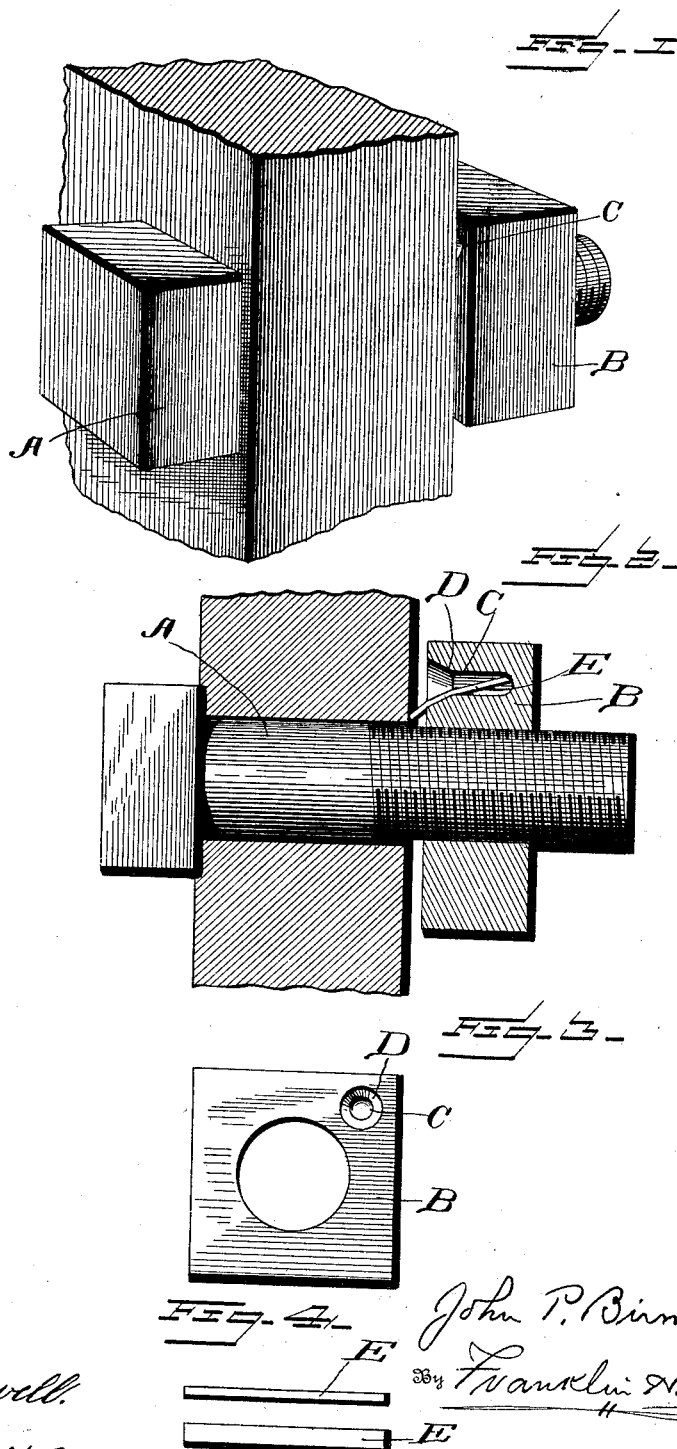

UNITED STATES PATENT OFFICE.

JOHN P. BIRMINGHAM, OF LEXINGTON, VIRGINIA, ASSIGNOR TO DAVID C. HUMPHREYS, TRUSTEE, OF LEXINGTON, VIRGINIA.

NUT-LOCK.

SPECIFICATION forming part of Letters Patent No. 707,499, dated August 19, 1902.

Application filed December 14, 1901. Serial No. 85,978. (No model.)

*To all whom it may concern:*

Be it known that I, JOHN P. BIRMINGHAM, a citizen of the United States, residing at Lexington, in the county of Rockbridge and State of Virginia, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in nut-locks, especially the provision of a lock comprising a nut which is threaded to fit over a bolt and having a recess formed within its face which is adjacent to the plate or other device to which the nut is held, said recess having a tapering bore adapted to loosely hold a flexible locking-pin, the outer end of which locking-pin projects beyond the face of the nut and is fastened to bite into the plate or other object adjacent to the nut, allowing the latter to turn only in one direction and locked from rotation on reverse motion of the nut.

The invention will be hereinafter more fully described and then specifically defined in the appended claim, and is clearly illustrated in the accompanying drawings, which, with the letters of reference marked thereon, form a part of this application, and in which drawings—

Figure 1 is a view in perspective showing my improved nut-lock as applied to the nut. Fig. 2 is a sectional view longitudinally through a bolt with a nut of my improved lock. Fig. 3 is a plan view of the face of the nut, showing the recess therein. Fig. 4 is a detail view of the flexible locking-pin.

Reference now being had to the details of the drawings by letter, A designates a bolt of ordinary construction, and B a nut which is threaded and fitted over said bolt. Said nut has a recess C in one face thereof, and the walls of said recess are tapering, as at D.

The locking-pin E is made, preferably, of spring metal and is loosely held within said recess with its outer end projecting a slight distance, preferably one-eighth of an inch, beyond the face of the nut. If desired, the inner end of this locking-pin may be retained in place by means of a wedge or other object, and the purpose of said pin is to yield in one direction when the nut is being screwed upon the bolt and when the outer end of said pin comes in contact with a plate or other object against which the nut is screwed. As the outer end of the pin comes in contact with the adjacent face of an object it will yield or buckle and will securely lock the nut from turning in the opposite direction.

When it is desired to remove the nut, an instrument may be inserted between the outer free end of the locking-pin and the surface against which it is held in contact and at the same time the nut unscrewed.

From the foregoing it will be noted that by the provision of a lock, as before described, and illustrated in the drawings, the cost of efficient nut-locks is reduced to a minimum and the lock is positive in its action and will automatically tighten under jar.

Having thus described my invention, what I claim to be new, and desire to secure by Letters Patent, is—

A nut-lock comprising in combination with the nut having a recess in one of its faces adjacent to the object to which the lock is applied, the walls of said recess tapering near its outer end, a flexible locking-pin mounted loosely in said recess, its free end projecting a slight distance beyond the outer end of the recess adapted to contact with an object to cause the pin to buckle in opposite directions accordingly as the nut is screwed upon or unscrewed from a bolt, as set forth.

In testimony whereof I hereunto affix my signature in presence of two witnesses.

JOHN P. BIRMINGHAM.

Witnesses:
FRANKLIN H. HOUGH,
A. L. HOUGH.